(12) United States Patent
Handschu

(10) Patent No.: US 12,077,398 B2
(45) Date of Patent: Sep. 3, 2024

(54) PROCESSES AND METHODS FOR MOVING OR STORING WASTE CONTAINING HAZARDOUS COMPONENTS

(71) Applicant: Heritage Environmental Services, LLC, Indianapolis, IN (US)

(72) Inventor: Daniel Handschu, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 16 days.

(21) Appl. No.: 17/938,062

(22) Filed: Oct. 5, 2022

(65) Prior Publication Data

US 2023/0038626 A1 Feb. 9, 2023

Related U.S. Application Data

(63) Continuation of application No. PCT/US2021/025969, filed on Apr. 6, 2021.

(Continued)

(51) Int. Cl.
*B65G 67/62* (2006.01)
*B65G 67/60* (2006.01)

(52) U.S. Cl.
CPC .......... *B65G 67/62* (2013.01); *B65G 67/603* (2013.01); *B65G 2201/0235* (2013.01); *B65G 2814/0397* (2013.01)

(58) Field of Classification Search
CPC .................. B65G 67/62; B65G 67/603; B65G 2201/0235; B65G 2814/0397;

(Continued)

(56) References Cited

U.S. PATENT DOCUMENTS

| 7,341,422 B1 | 3/2008 | McCown et al. |
| 2018/0050875 A1* | 2/2018 | Araki ............... B63B 27/00 |

FOREIGN PATENT DOCUMENTS

JP S6351222 A 3/1988

OTHER PUBLICATIONS

United States Environmental Protection Agency, "Polychlorinated Biphenyl (PCB) Site Revitalization Guidance Under the Toxic Substances Control Act (TSCA)". Nov. 2005. https://www.epa.gov/sites/production/files/2015-08/documents/pcb-guid3-06.pdf. 87 pages.

(Continued)

*Primary Examiner* — Lynn E Schwenning
(74) *Attorney, Agent, or Firm* — Woodard, Emhardt, Henry, Reeves & Wagner, LLP

(57) ABSTRACT

In preferred embodiments, the present disclosure relates to methods for transportation of hazardous waste and/or waste classified under TSCA, and may comprise the acts of: translocating at least one intermodal trailer chassis from a primary terrestrial site to a first stationary barge, wherein said trailer chassis is carrying an intermodal shipping container containing the waste material, and wherein the first stationary barge is adapted to rise and fall with changes to the water level; moving the intermodal trailer chassis carrying the intermodal shipping container from the first stationary barge to a mobile barge adapted to traverse the body of water; traversing the body of water with the mobile barge; and offloading the at least one intermodal trailer chassis carrying the intermodal shipping container to a secondary terrestrial site via a second stationary barge.

14 Claims, 2 Drawing Sheets

Related U.S. Application Data

(60) Provisional application No. 63/006,108, filed on Apr. 7, 2020.

(58) Field of Classification Search
CPC ... Y02W 90/00; G06Q 10/0832; G06Q 10/30; B63B 27/14; B63B 35/28
See application file for complete search history.

(56) References Cited

OTHER PUBLICATIONS

United States Code of Federal Regulations, "Title 40 Part 261 Identification and Listing of Hazardous Waste; Context Title 40—Protection of Environment". [retrieved Mar. 8, 2021]. 265 pages. Retrieved from the Internet: URL: https://www.govinfo.gov/content/pkg/CFR-2012-title40-vol27/xml/CFR-2012-title40-vol27-part261.xml.

United States Code of Federal Regulations, "Title 40 Part 761 Polychlorinated Biphenyls (PCBs) Manufacturing, Processing, Distribution in Commerce, and Use Prohibitions". [retrieved Mar. 8, 2021]. 129 pages. Retrieved from the Internet: URL: https://www.govinfo.gov/app/details/CFR-2010-title40-vol30/CFR-2010-title40-vol30-part761.

Envirocon, Inc. "Appendix D: Hastings-On-Hudson Remedial Construction Concepts." Feb. 15, 2016. 46 pages.

Darl Kuhn, "Modular Floating Production System" ip.com. West Henryetta, NY, US Feb. 14, 2014, pp. 3-5. 7 pages.

International Application No. PCT/US2021/025969 Written Opinion mailed Jul. 6, 2021. 6 pages.

International Application No. PCT/US2021/025969 Search Report mailed Jul. 6, 2021. 3 pages.

\* cited by examiner

PROCESSES AND METHODS FOR MOVING OR STORING WASTE CONTAINING HAZARDOUS COMPONENTS

CROSS-REFERENCE TO RELATED APPLICATIONS

This application is a continuation of International Application No. PCT/US2021/025969 filed Apr. 6, 2021, which claims the benefit of U.S. Provisional Application No. 63/006,108 filed Apr. 7, 2020, each of which are hereby incorporated by reference herein in their entirety.

BACKGROUND

When moving and/or storing waste containing hazardous components, precautions and/or special handling methods may be used to minimize contamination, loss, and/or spread of hazardous material. Often such precautions and/or special handling methods increase the cost of remediation or transport of these materials. Furthermore, geographic and infrastructure limitations of the property and locality where waste containing hazardous components reside may present additional challenges for remediation. Therefore, there remains a need for improved processes and/or methods for moving or storing waste containing hazardous components.

SUMMARY

In some embodiments, the present disclosure relates to transportation of hazardous waste and/or waste classified under the Toxic Substances Control Act (TSCA). For example, in certain embodiments, waste containing polychlorinated biphenyls (PCBs) may be transported.

In some embodiments, the present disclosure utilizes one or more transport barges to move waste over a body of water; stationary barges, such as a spudded landing barge (also known as a spud barge); shipping containers including, but not limited to, intermodal shipping containers (e.g., fully enclosed rectangular containers); trailer chassis; and/or vehicles, including but not limited to trucks such as a semi-tractor, to move the shipping containers over one or more terrestrial locations, and/or onload or offload the shipping containers to one or more of the barges. In certain embodiments, the waste is moved from one terrestrial site to another terrestrial site over a body of water.

In other aspects, the present disclosure relates to the transportation of hazardous waste and/or waste classified under the Toxic Substances Control Act (TSCA) while not using a bulkhead crane, overhead crane, or other large crane.

In some embodiments, the disclosed methods may use an intermodal pin chassis to haul placarded containers and/or to load a transport barge using a semi-tractor.

In some embodiments, the method for transportation of hazardous waste and/or waste classified under TSCA may comprise the acts of: translocating at least one intermodal trailer chassis from a primary terrestrial site to a first stationary barge, wherein said trailer chassis is carrying an intermodal shipping container containing the waste material, and wherein the first stationary barge is adapted to rise and fall with changes to the water level; moving the intermodal trailer chassis carrying the intermodal shipping container from the first stationary barge to a transport barge adapted to traverse the body of water; traversing the body of water with the transport barge; and offloading the at least one intermodal trailer chassis carrying the intermodal shipping container to a secondary terrestrial site via a second stationary barge.

Additional embodiments of the disclosure, as well as features and advantages thereof, will be apparent from the descriptions herein.

DETAILED DESCRIPTION

Figure 1:
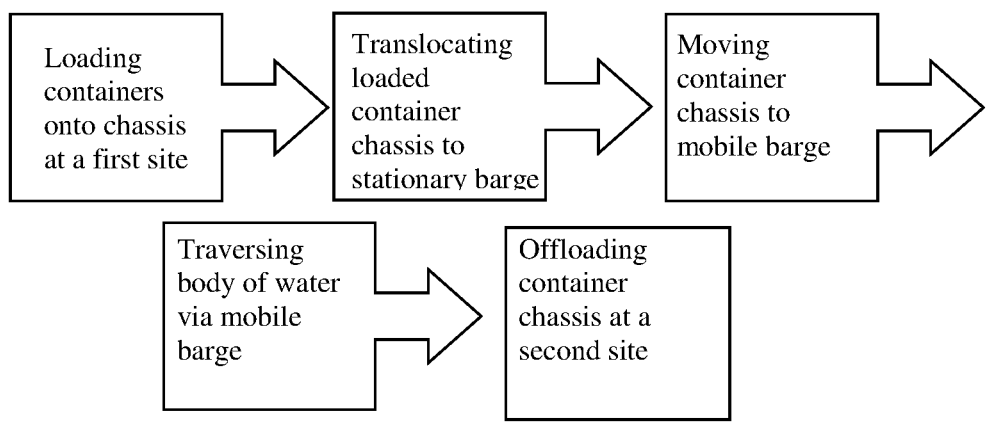
FIG. 1 shows a simplified flow chart diagram of one embodiment of the present disclosure comprising the acts of: loading containers, for example intermodal transportation containers on a trailer chassis, with hazardous waste and/or TSCA waste at a first terrestrial site; translocating and/or loading an intermodal transportation container, for example with hazardous waste, on a trailer chassis to a first stationary barge; moving and/or translocating an intermodal transportation container with hazardous waste on a trailer chassis to a second and/or mobile barge; traversing a body of water with a second and/or mobile barge; and offloading an intermodal transportation container with hazardous waste on a trailer chassis to a second terrestrial site.

For the purposes of promoting an understanding of the principles of the present disclosure, reference will now be made to certain embodiments and specific language will be used to describe the same. It will nevertheless be understood that no limitation of the scope of the disclosure is thereby intended, such alterations and further modifications, and such further applications of the principles of the disclosure as described herein being contemplated as would normally occur to one skilled in the art to which the disclosure relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

In some embodiments, the present disclosure relates to transportation of hazardous waste and/or waste classified under the Toxic Substances Control Act (TSCA). For example, in certain preferred embodiments, waste containing polychlorinated biphenyls (PCBs) may be transported. Title 40 of the United States Code, "Protection of Environment", includes codified laws regarding Polychlorinated biphenyls including Part 761, which is hereby incorporated by reference in its entirety. Furthermore, Part 261 relates to Identification and Listing of Hazardous Waste and is also incorporated herein by reference in its entirety. Additionally, the Environmental Protection Agency (EPA) has published certain guidance regarding revitalization and remediation for PCB-containing waste. For example, the EPA has published "Polychlorinated Biphenyl (PCB) Site Revitalization Guidance Under the Toxic Substances Control Act (TSCA)" in November 2005, which is hereby incorporated herein by reference in its entirety (Available at https://www.epa.gov/sites/production/files/2015-08/documents/pcb-guid3-06.pdf). For example, waste containing greater than 50 parts per million (ppm) PCD may be regulated under TSCA. Waste may also be classified as hazardous, but not regulated under TSCA, sometimes referred to as "Non-TSCA" waste when the waste comprises less than 50 milligrams per kilogram (mg/kg) PCB. In one embodiment of the present disclosure, sampling of waste material may be performed using one sample per 200 cubic yards (CY) of waste to one sample per 2,000 CY of waste. In other embodiments, sampling can be performed using one sample per 300 CY of waste, one sample per 400 CY of waste, one sample per 500 CY of waste, one sample per 600 CY of waste, one sample per 750 CY of waste, one sample per 1000 CY of waste, one sample per 1250 CY of waste, one sample per 1500 CY of waste, and/or one sample per 1750 CY of waste.

In some embodiments, the present disclosure utilizes one or more barges, including stationary and mobile barges, to move waste over a body of water; shipping containers, including, but not limited to, intermodal (IM) shipping containers; trailer chassis; and/or vehicles, such as trucks or semi-tractors. In certain embodiments, the waste is moved from one terrestrial site to another terrestrial site over a body of water on a mobile barge. In certain embodiments, one or more stationary barges may be utilized to facilitate loading of one or more mobile barges. For example, in one embodiment, a spudded barge is used as a stationary barge to facilitate loading of a mobile barge. In some embodiments, one or more ramps, docks, or barges such as a spudded barge may be used to facilitate loading and/or staging of materials for placement on a mobile barge. A stationary barge, as referred to herein, may also be referred to as a "roll-on/roll-off landing barge." When used, a ramp may have for example, but is not limited to having, dimensions of 60 feet in length and 53 feet in width. In some embodiments, when used, a ramp connecting a terrestrial site to a stationary barge may be able to account for any change in tide and/or vertical positioning of the stationary barge.

In certain preferred embodiments, the shipping containers used may have a width of 8 feet; a height of 6 feet, 6 feet 9 inches, 8 feet, 8 feet 6 inches, 9 feet 6 inches, or 4 feet 3 inches; and/or a length of 20 feet, 40 feet, 48 feet, or 53 feet. In some embodiments, the shipping containers may comprise a volume of 1,172 cubic feet ($ft^3$)(33.2 $m^3$), 2,389 $ft^3$ (67.6 $m^3$), 3,264 $ft^3$ (92.4 $m^3$), 3,604 $ft^3$ (102.1 $m^3$), 1,520 $ft^3$ (43 $m^3$), or 680 $ft^3$ (19.3 $m^3$). In some embodiments, a shipping container may hold approximately 22.5 tons of material. In some embodiments, a shipping container is placarded, or covered, when used or transported. Other containment precautions, such as lining a shipping container may also be utilized in certain embodiments of the present disclosure. For example, plastic sheets may be used to line a shipping container, and/or a resin or other polymer may be sprayed into or on the shipping container to line the container in some embodiments.

In other aspects, the present disclosure relates to the transportation of hazardous waste and/or waste classified under the Toxic Substances Control Act while not using a bulkhead crane, overhead crane, or other large crane. Cranes can be costly to erect, operate, maintain, and may require other infrastructure that may not be available at a remediation site, dock, or other location where a barge may be loaded. Therefore, in some embodiments, a trailer chassis with a shipping container may be utilized to load and/or unload a barge with waste to be remediated. For example, in some embodiments, methods disclosed herein may use an intermodal pin chassis to haul placarded containers and/or to load a transport barge using a semi-tractor.

In some embodiments, the method for transportation of hazardous waste and/or waste classified under TSCA may comprise the acts of: translocating at least one intermodal trailer chassis from a primary terrestrial site to a first stationary barge, wherein said trailer chassis is carrying an intermodal shipping container containing the waste material, and wherein the first stationary barge is adapted to rise and fall with changes to the water level; moving the intermodal trailer chassis carrying the intermodal shipping container from the first stationary barge to a mobile barge adapted to traverse the body of water; traversing the body of water with the mobile barge; and offloading the at least one intermodal trailer chassis carrying the intermodal shipping container to a secondary terrestrial site via a second stationary barge.

In one embodiment, a batch of 250 tons may be transported in 12 intermodal containers on a barge, each intermodal container comprising a capacity of 22.5 tons each. In another embodiment, 24 intermodal containers may be transported on a mobile barge. In still other embodiments, 36 or 48 intermodal trailers may be transported on a mobile barge. In certain embodiments, the transportation cycle may comprise the acts of a tug arriving with empty intermodal containers on chassis on the deck of a mobile barge; off-loading the empty containers, for example by use of a semi-tractor; loading intermodal containers with waste onto the deck of a mobile barge, for example by use of a semi-tractor; and/or the tug and mobile barge departing.

FIG. 1 shows a simplified flow chart diagram of one embodiment of the present disclosure comprising the acts of: loading containers, for example intermodal transportation containers on a trailer chassis, with hazardous waste at a terrestrial site; translocating an intermodal transportation container, for example with hazardous waste, on a trailer chassis to a first stationary barge; an intermodal transportation container with hazardous waste on a trailer chassis to a mobile barge; traversing a body of water with the mobile barge; and offloading the intermodal transportation container with hazardous waste on the trailer chassis to a terrestrial site.

Figure 2:
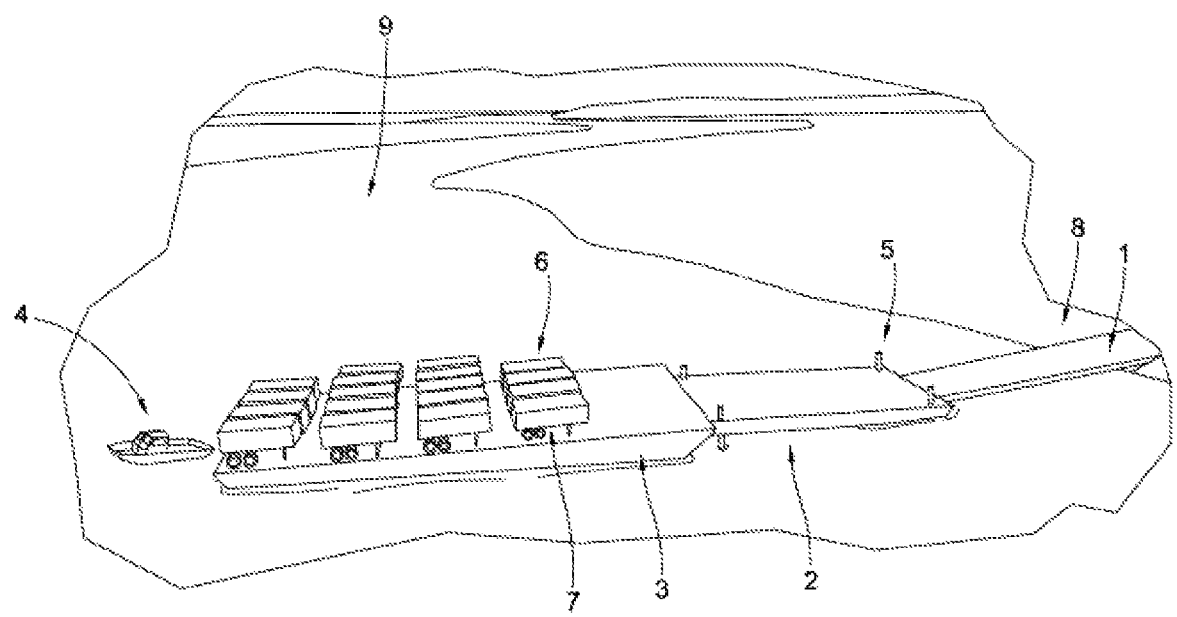
FIG. 2 shows a digital image of a stationary barge, a mobile barge, and a body of water that may be used in embodiments of the present disclosure.

FIG. 2 shows a drawing of one embodiment of the present disclosure comprising ramp (1), which extends over the shoreline (8) of a body of water (9) such as a river, the ramp (1) leading to a stationary barge (2) which is held in place by spuds (5) which allows the stationary barge to raise and lower with the tide, a mobile barge (3) loaded with shipping containers (6), such as covered intermodal shipping containers, on trailers (7). The mobile barge can be moved by one or more tugs (4).

The uses of the terms "a" and "an" and "the" and similar references in the context of describing the disclosure (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the present disclosure has been illustrated and described in detail in the drawings and the foregoing description, the same is to be considered as illustrative and not restrictive in character, it being understood that only the preferred embodiment has been shown and described and that all changes and modifications that come within the spirit of the disclosure are desired to be protected. In addition, all references cited herein are indicative of the level of skill in the art and are hereby incorporated by reference in their entirety.

EMBODIMENTS

The following provides an enumerated listing of some of the embodiments disclosed herein. It will be understood that this listing is non-limiting, and that individual features or combinations of features (e.g. 2, 3 or 4 features) as described in the Detailed Description above can be incorporated with the below-listed Embodiments to provide additional disclosed embodiments herein.

1. A method for transporting a waste material comprising hazardous waste or TSCA waste over a body of water, said body of water having a water level, wherein the method comprises:
translocating at least one intermodal trailer chassis from a primary terrestrial site to a first stationary barge, wherein said trailer chassis is carrying an intermodal shipping container containing the waste material, and wherein the first stationary barge is adapted to rise and fall with changes to the water level;
is moving the intermodal trailer chassis carrying the intermodal shipping container from the first stationary barge to a mobile barge adapted to traverse the body of water;
traversing the body of water with the mobile barge; and
offloading the at least one intermodal trailer chassis carrying the intermodal shipping container to a secondary terrestrial site via a second stationary barge.

2. The method of embodiment 1, wherein the first stationary barge comprises a spudded landing barge.

3. The method of any one of embodiments 1 to 2, wherein the waste material is sourced from the primary terrestrial site.

4. The method of any one of embodiments 1 to 3, wherein the at least one intermodal trailer chassis carrying the intermodal shipping container is translocated to the first stationary barge via a barge ramp.

5. The method of any one of embodiments 1 to 4, wherein the intermodal container comprises a 20-ft container.

6. The method of any one of embodiments 1 to 5, wherein the intermodal container comprises a 40-ft container.

7. The method according to any one of embodiments 1 to 6, wherein the waste material comprises a polychlorinated biphenyl (PCB) waste.

8. The method according to any one of embodiments 1 to 7, wherein the body of water is connected to a sea or an ocean.

9. The method according to any one of embodiments 1 to 8, wherein the body of water is a harbor.

10. The method according to any one of embodiments 1 to 8, wherein the body of water is a river.

11. The method according to any one of embodiments 1 to 10, wherein the changes in water level are due to tidal activity.

12. The method according to any one of embodiments 1 to 11, wherein the trailer chassis is an intermodal pin chassis.

13. The method according to any one of embodiments 1 to 12, wherein the offloaded intermodal trailer chassis carrying the intermodal shipping container is transported about the secondary terrestrial site via a semi-tractor.

14. The method according to any one of embodiments 1 to 13, wherein the intermodal shipping container is fully enclosed.

What is claimed is:

1. A method for transporting a waste material comprising hazardous waste or TSCA waste over a body of water, said body of water having a water level, wherein the method comprises:
translocating at least one intermodal trailer chassis from a primary terrestrial site to a first stationary barge, wherein said trailer chassis is carrying an intermodal shipping container containing the waste material, and wherein the first stationary barge is adapted to rise and fall with changes to the water level of the body of water,
moving the intermodal trailer chassis carrying the intermodal shipping container from the first stationary barge to a mobile barge adapted to traverse the body of water;
traversing the body of water with the mobile barge; and
offloading the at least one intermodal trailer chassis carrying the intermodal shipping container to a secondary terrestrial site via a second stationary barge, wherein the second stationary barge is adapted to rise and fall with changes to the water level of the body of water.

2. The method of claim 1, wherein the first stationary barge comprises a spudded landing barge.

3. The method of claim 1, wherein the waste material is sourced from the primary terrestrial site.

4. The method of claim 1, wherein the at least one intermodal trailer chassis carrying the intermodal shipping container is translocated to the first stationary barge via a barge ramp.

5. The method of claim 1, wherein the intermodal container comprises a 20-ft container.

6. The method of claim 1, wherein the intermodal container comprises a 40-ft container.

7. The method according to claim 1, wherein the waste material comprises a polychlorinated biphenyl (PCB) waste.

8. The method according to claim 1, wherein the body of water is connected to a sea or an ocean.

9. The method according to claim 1, wherein the body of water is a harbor.

10. The method according to claim 1, wherein the body of water is a river.

11. The method according to claim 1, wherein the changes in water level are due to tidal activity.

12. The method according to claim 1, wherein the trailer chassis is an intermodal pin chassis.

13. The method according to claim 1, wherein the offloaded intermodal trailer chassis carrying the intermodal shipping container is transported about the secondary terrestrial site via a semi-tractor.

14. The method according to claim 1, wherein the intermodal shipping container is fully enclosed.

* * * * *